(12) United States Patent
Zhao

(10) Patent No.: US 10,018,499 B2
(45) Date of Patent: Jul. 10, 2018

(54) BALANCE WITH WINDPROOF STRUCTURE ISOLATING THE WEIGHING PAN FROM THE WEIGHING SENSOR

(71) Applicants: Ohaus Instruments (Changzhou) Co., Ltd., Changzhou, Jiangsu (CN); Ohaus Instruments (Shanghai) Co., Ltd., Shanghai (CN)

(72) Inventor: Fangyuan Zhao, Shanghai (CN)

(73) Assignees: OHAUS INSTRUMENTS (CHANGZHOU) CO., LTD., Changzhou, Jiangsu (CN); OHAUS INSTRUMENTS (SHANGHAI) CO., LTD., Shanghai (CN)

(*) Notice: Subject to any disclaimer, the term of this patent is extended or adjusted under 35 U.S.C. 154(b) by 196 days.

(21) Appl. No.: 15/142,975

(22) Filed: Apr. 29, 2016

(65) Prior Publication Data
US 2016/0238434 A1 Aug. 18, 2016

Related U.S. Application Data

(63) Continuation of application No. PCT/CN2014/090588, filed on Nov. 7, 2014.

(30) Foreign Application Priority Data

Nov. 7, 2013 (CN) ............... 2013 2 0700380 U

(51) Int. Cl.
*G01G 21/28* (2006.01)
*G01G 23/48* (2006.01)

(52) U.S. Cl.
CPC ........... *G01G 21/286* (2013.01); *G01G 23/48* (2013.01)

(58) Field of Classification Search
CPC ..................... G01G 21/286; G01G 23/48
See application file for complete search history.

(56) References Cited

U.S. PATENT DOCUMENTS 4,465,152 A * 8/1984 Schmitter ............ G01G 21/286
  177/180
4,858,711 A * 8/1989 Kunz ................... G01G 21/283
  177/212

(Continued)

FOREIGN PATENT DOCUMENTS

CN    203053554 U    7/2013
CN    203259242 U    10/2013

(Continued)

OTHER PUBLICATIONS

Computer translation of JP 62179615. dated Jan. 4, 2018.*

*Primary Examiner* — Randy Gibson
(74) *Attorney, Agent, or Firm* — Standley Law Group LLP

(57) ABSTRACT

A balance has a draft shield provided therefor. The shield has a base with upper and lower base covers (5, 6). The upper cover has a central hole in the middle thereof. A windproof ring is placed above the upper cover around a weighing pan of the balance. A shield (7) that is placed between the upper cover and the lower cover receives a weighing sensor (8) of the balance. A wind shield is placed above the base and a weighing compartment for receiving the weighing pan is placed between the wind shield and the upper cover. The windproof structure also has an isolation baffle (2) that is placed between the weighing pan and the upper cover. The high-accuracy balance of the present invention may effectively prevent air flow disturbances inside the balance.

11 Claims, 6 Drawing Sheets

(56) References Cited

U.S. PATENT DOCUMENTS

| | | | |
|---|---|---|---|
| 6,515,238 B1 * | 2/2003 | Martens | G01G 21/286 |
| | | | 177/180 |
| 7,145,086 B2 * | 12/2006 | Iiduka | G01G 21/286 |
| | | | 177/180 |
| 7,960,658 B2 | 6/2011 | Mock | |
| 8,294,045 B2 | 10/2012 | Lüchinger et al. | |
| 9,024,213 B2 | 5/2015 | Izumo et al. | |

FOREIGN PATENT DOCUMENTS

| | | |
|---|---|---|
| CN | 203551084 U | 4/2014 |
| JP | 62-179615 A | 8/1987 |

* cited by examiner

BALANCE WITH WINDPROOF STRUCTURE ISOLATING THE WEIGHING PAN FROM THE WEIGHING SENSOR

CROSS-REFERENCE TO RELATED APPLICATIONS

This application is a by-pass continuation that claims the benefit of priority to PCT/CN2014/090588, filed on 7 Nov. 2014, which in turn claims the benefit of priority to CN 201320700380.0, which was filed on 7 Nov. 2013. Both applications are incorporated by reference as if fully recited herein.

TECHNICAL FIELD

The present invention relates to the field of weighing apparatus, and more particularly, to a windproof technique of high-accuracy balances.

BACKGROUND

The current balances and microbalances employ the following methods to reduce disturbances of external air flows and internal sensor air flows: opening a hole on the weighing pan; reducing the size of the weighing pan; forming the weighing pan into a grille/grid; enlarging or heightening the windproof ring; adding a horizontal baffles inside the wind shield to reduce the volume of the wind shield; etc. However, some of these methods cost too much, for example, opening a hole on the weighing pan and forming the weighing pan into a grid. Others may affect user experiences, for example, high windproof ring or small weighing pan may prevent weighing of large-area objects; adding horizontal baffles inside the wind shield may prevent weighing of relatively high objects. Further, after a large number of tests, these methods are proved to have limited practical effects.

SUMMARY

In order to address the above-identified drawbacks in the prior art, the present invention provides a windproof structure that prevents air flow disturbances inside a high-accuracy balance and a high-accuracy balance comprising the windproof structure.

According to an aspect of the present invention, a windproof structure of a balance is provided. The windproof structure comprises: a base comprising an upper base cover and a lower base cover, the upper base cover having a central hole placed in the middle, a windproof ring being placed above the upper base cover around a weighing pan of the balance, a shield being placed between the upper base cover and the lower base cover, the shield receiving a weighing sensor of the balance. A wind shield is placed above the base, and a weighing compartment for receiving the weighing pan is formed between the wind shield and the upper base cover. The windproof structure further comprises an isolation baffle, the isolation baffle being placed between the weighing pan and the upper base cover. The upper base cover has a air exchange hole placed in a region close to a back plate of the wind shield.

According to an aspect of the present invention, the isolation baffle has a distance of 10-30 mm to the upper base cover.

According to an aspect of the present invention, the isolation baffle has a distance of 20 mm to the upper base cover.

According to an aspect of the present invention, the isolation baffle has a hole located in the middle.

According to an aspect of the present invention, the isolation baffle is secured to an annular flange of the upper base cover via its bracket.

According to an aspect of the present invention, the material of the isolation baffle is plastic or metal.

According to an aspect of the present invention, the hole-edge of the air exchange hole is convex in shape.

According to an aspect of the present invention, the area of the air exchange hole is approximately 1000 mm$^2$.

According to another aspect of the present invention, a windproof structure of a balance is provided. The windproof structure comprises: a base comprising an upper base cover and a lower base cover, the upper base cover having a central hole placed in the middle. A shield is located between the upper base cover and the lower base cover the shield receiving a weighing sensor of the balance. A wind shield is placed above the base, and a weighing compartment for receiving the weighing pan is formed between the wind shield and the upper base cover. The windproof structure further comprises an isolation baffle, the isolation baffle comprising a primary baffle, the primary baffle being placed between the weighing pan and the upper base cover, and the primary baffle having a flat portion in the middle and a skewed portion at the edge, wherein a through-hole being placed at the junction of the flat portion and the skewed portion.

Preferably the isolation baffle is made of one piece.

According to an aspect of the present invention, the primary baffle has a distance of 10-30 mm to the upper base cover. Preferably, the primary baffle has a distance of 20 mm to the upper base cover.

According to an aspect of the present invention, the flat portion has a hole placed in the middle.

According to an aspect of the present invention, the isolation baffle further comprises a cone plate, the cone plate being placed below the primary baffle with its outer cone surface downwards.

According to an aspect of the present invention, the isolation baffle further comprises a bracket, the bracket being secured to the upper base cover via its bracket.

According to an aspect of the present invention, the upper base cover has a air exchange hole placed in a region near a back plate of the wind shield.

According to an aspect of the present invention, the hole edge of the air exchange hole is convex in shape.

According to an aspect of the present invention, the area of the air exchange hole is approximately 1000 mm$^2$.

According to an aspect of the present invention, a base cavity formed between the upper base cover and the lower base cover is not ventilated with respect to a weighing sensor cavity formed between the upper base cover and the shield.

According to another aspect of the present invention, a balance is provided. The balance comprises a windproof structure; a weighing pan, the weighing pan being placed within the wind shield of the windproof structure and right above the central hole placed in the upper base cover. A weighing sensor is placed within the shield between the upper base cover and the lower base cover and a connecting rod passes through the central hole in the upper base cover and the hole of the isolation baffle and connects the weighing pan and the weighing sensor. The windproof structure comprises a base comprising an upper base cover and a lower base cover, the upper base cover having a central hole placed in the middle. A windproof ring is placed above the upper base cover around the weighing pan of the balance and a shield is placed between the upper base cover and the lower base cover, wherein the shield receives a weighing sensor of the balance. A wind shield is placed above the base, and a weighing compartment for receiving the weighing pan is formed between the wind shield and the upper base cover. The windproof structure further comprises an isolation baffle, the isolation baffle being placed between the weighing pan and the upper base cover.

By redesigning the air flow channels inside the balance with a low-cost method, the high-accuracy balance may still have rapid stability ability and good repeatability under adverse conditions such as wind disturbance of air conditioner, air flow disturbance caused by people walking, hot air flow disturbances of weighing sensors and circuit boards.

The above general description and following detailed description of the present invention are exemplary and illustrative, and are intended to provide further explanations for the present invention as recited in the claims.

BRIEF DESCRIPTION OF DRAWINGS

Accompanied drawings are included to provide a further understanding of the present invention, and are included and formed as a part of the present application. Embodiments of the present invention are illustrated in accompanying drawings and are used to explain the principles of the present invention together with this description. In the drawings.

DETAILED DESCRIPTION

Embodiments of the present invention will now be described in detail in connection with the accompanying drawings.

Figure 1:
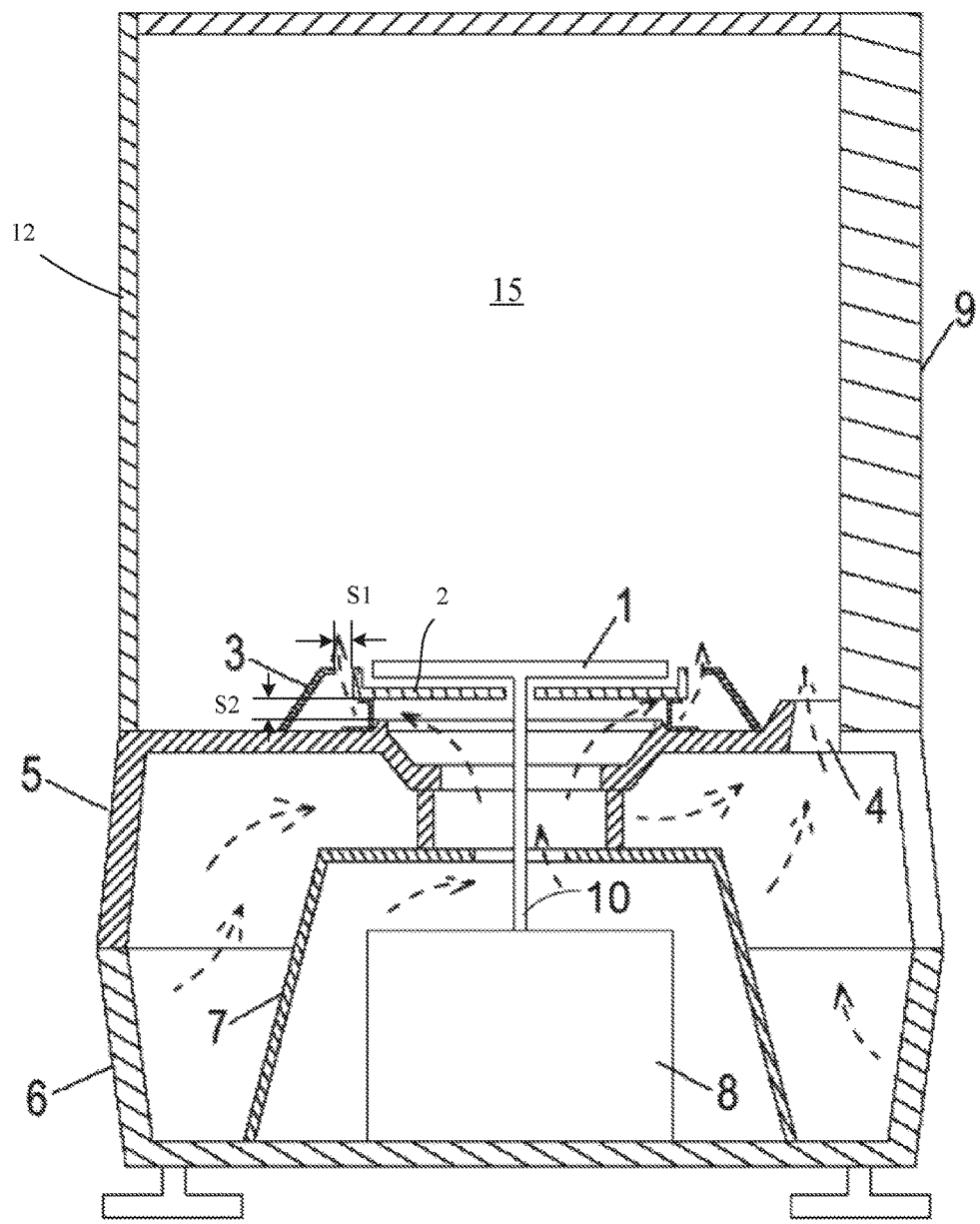
FIG. 1 is a sectional view of a high-accuracy balance having a windproof structure according to a first embodiment.

FIG. 1 is a sectional view of a high-accuracy balance having a windproof structure according to a first embodiment of the present invention. The balance 100 comprises a windproof structure, a weighing pan 1, a weighing sensor 8, and a connecting rod 10.

In an embodiment of the present invention, the windproof structure comprises a base and a wind shield 12 placed above the base. The base comprises an upper base cover 5 and a lower base cover 6. The upper base cover 5 has a central hole placed in the middle. A windproof ring 3 is placed above the upper base cover 5 around the weighing pan 1 of the balance 100. A shield 7 is placed between the upper base cover 5 and the lower base cover 6 that receives the weighing sensor 8 of the balance 100. A sealing cavity/weighing compartment 15 for receiving the weighing pan 1 is formed between the wind shield 12 and the upper base cover 5.

When the balance 100 is at a preheating stage or bearing large loads or in a variable temperature environment, the weighing sensor 8 itself and a cavity where the weighing sensor 8 is located (hereinafter "sensor cavity") may have certain air flows due to heat. This (hot) air is mostly distributed into the weighing compartment via a hole under the weighing pan 1. In order to increase accuracy, an isolation baffle 2 may be placed under the weighing pan to remove the effects of the air flows so that the weighing pan 1 is not disturbed and the readings of the measured load are stable. In a specific example, the windproof structure further comprises an isolation baffle 2 placed between the weighing pan and the upper base cover 5. The isolation baffle 2 provides protection to the weighing pan 1 together with the windproof ring 3. A gap S1 is located between the isolation baffle 2 and the windproof ring 3. The gap S1 and a space S2 between the baffle 2 and the upper base cover 5 form a air convection channel. In a further example, the space in the height direction of the weighing pan 1 and the central hole may be increased. Without affecting the appearance, the distance in the height direction of the space between the isolation baffle 2 and the upper base cover 5 may be increased. Increasing the space may significantly reduce the speed of air flow so that the air flow may be effectively buffered before rising to the isolation baffle 2. More specifically, the distance between the isolation baffle 2 and the upper base cover 5 may be 10-30 mm. In a specific embodiment, the distance between the isolation baffle 2 and the upper base cover 5 may be 20 mm. The isolation baffle 2 has a hole placed in the middle for the connecting rod 10 of the balance 100 to go through, where the connecting rod 10 connects the weighing pan 1 and the weighing sensor 8. The isolation baffle 2 is secured to an annular flange (as shown by reference numeral 51 of FIG. 3(b)) of the upper base cover 5 via its bracket (as shown by reference numeral 22 of FIG. 2(b)). The bracket 22 of the isolation baffle 2 has annular features. The material of the isolation baffle 2 may be plastic or metal.

The weighing pan 1 is located within the windproof ring 3 of the windproof structure and right above the central hole placed in the upper base cover 5.

The weighing sensor 8 is located within the shield 7 that is placed between the upper base cover 5 and the lower base cover 6.

The connecting rod 10 goes through the central hole in the upper base cover 5 and the hole in the isolation baffle 2, and connects the weighing pan 1 and the weighing sensor 8.

In another embodiment of the present invention, the upper base cover 5 has a air exchange hole 4 placed in a region of a back plate 9 of the wind shield 12. Since the levels of sealing of the base portion and the wind shield 12 portion of the balance 100 are different, there may be a pressure difference between the base portion and the wind shield 12 portion so as to cause flow of air, when external air flows blow to the balance 100. Therefore, the air exchange hole 4 placed in the upper base cover 5 of the balance 100 may connect the base and the weighing compartment 15 so as to eliminate the pressure difference as quickly as possible. In a specific example, the upper base cover 5 has a strip-like air exchange hole 4 placed in a region close to the back plate 9 of the wind shield 12. The hole edge of the air exchange hole 4 may be heightened so as to prevent liquid or grain slip into the air exchange hole 4. In a specific example, the hole edge of the leak hole 4 is of convex shape. The area of the air exchange hole 4 has to be large enough so that the air flows slowly when eliminating pressure difference in order not to affect the weighing pan 1 and the objects to be weighed. In a specific example, the area of the air exchange hole 4 is approximately 1000 mm².

The high-accuracy balance having windproof structure as shown in FIG. 1 may allow the air present in a cavity formed by the shield 7 and the weighing sensor 8 and present in a cavity formed by the upper base cover 5 and the lower base cover 6 to flow in a direction as shown in dotted arrow so as to protect the stability of the balance 100.

Figure 2A:
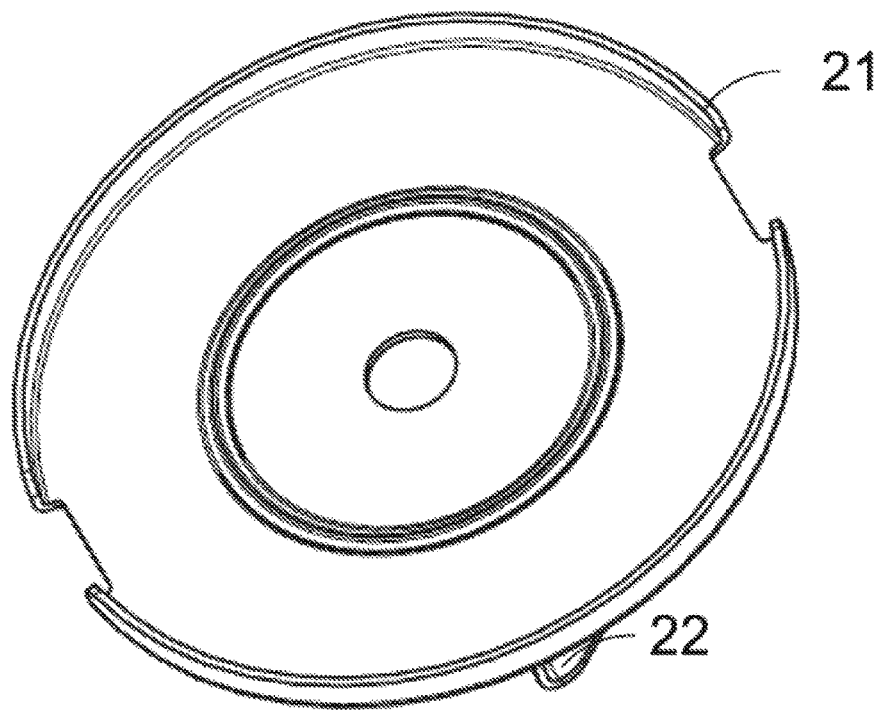
FIG. 2(a) is a front perspective view of an isolation baffle inside the windproof structure.
Figure 2B:
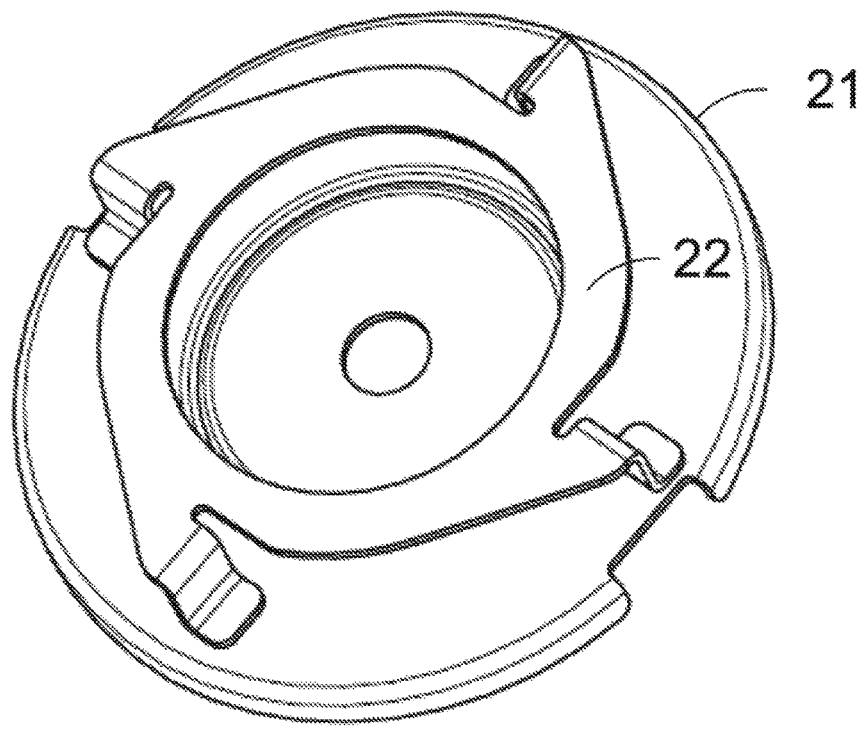
FIG. 2(b) is a bottom perspective view of an isolation baffle inside the windproof structure.

FIG. 2(a) is a front perspective view of an isolation baffle 2 inside the windproof structure according to a first embodiment of the present invention. FIG. 2(b) is a bottom perspective view of an isolation baffle 2 inside the windproof structure according to a first embodiment of the present invention. With reference to FIGS. 2(a) and 2(b), the isolation baffle is formed by a primary baffle 21 and a bracket 22. The primary baffle 21 is in a disc shape. The bracket 22 has a plurality of bending legs and its center is in a large disc shape. The primary baffle 21 and the bracket 22 may be firmly jointed via viscose glue or welding. The material of the isolation baffle may be plastic or sheet metal piece.

Figure 3A:
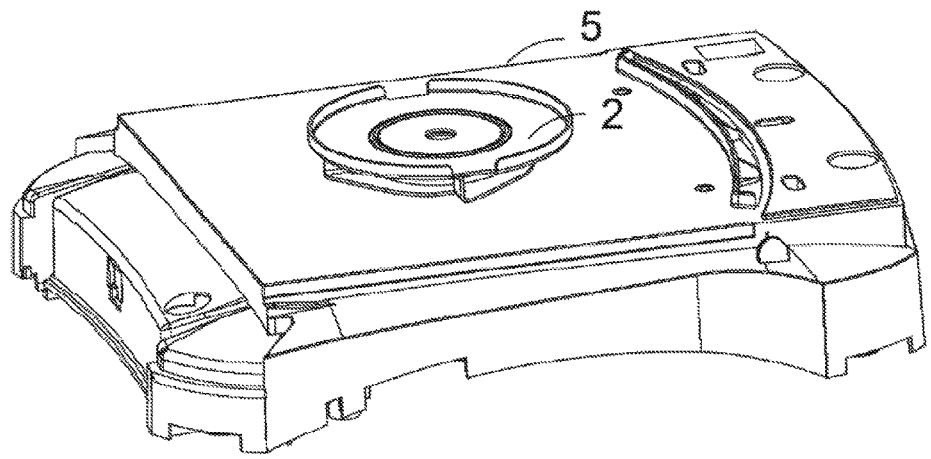
FIG. 3(a) is a structural diagram of an isolation baffle according to the first embodiment, mounted on an upper base cover of the high-accuracy balance.
Figure 3B:
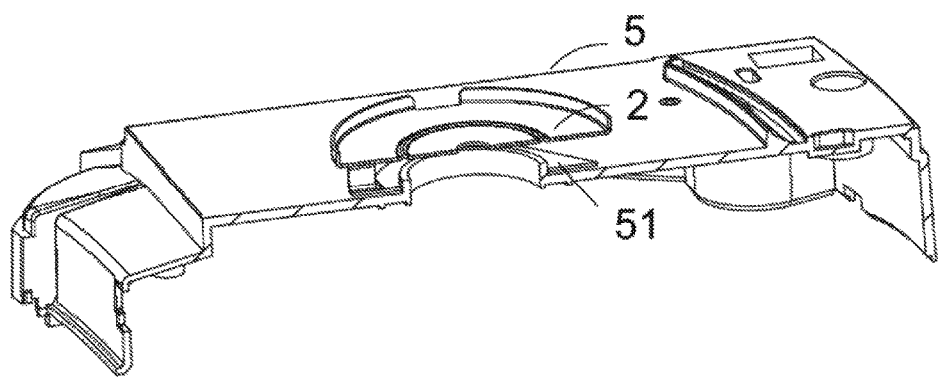
FIG. 3(b) is a sectional view of an isolation baffle according to the first embodiment, mounted on an upper base cover of the high-accuracy balance.

FIG. 3(a) is a structural diagram of an isolation baffle 2 according to a first embodiment of the present invention being mounted on an upper base cover 5 of the high-accuracy balance 100. FIG. 3(b) is a sectional view of an isolation baffle 2 according to a first embodiment of the present invention being mounted on an upper base cover 5 of the high-accuracy balance 100. With reference to FIGS. 3(a) and 3(b), the isolation baffle 2 is secured to an annular flange 51 of the upper base cover 5 via its bracket (as shown by reference numeral 22 of FIG. 2(b)).

Figure 4:
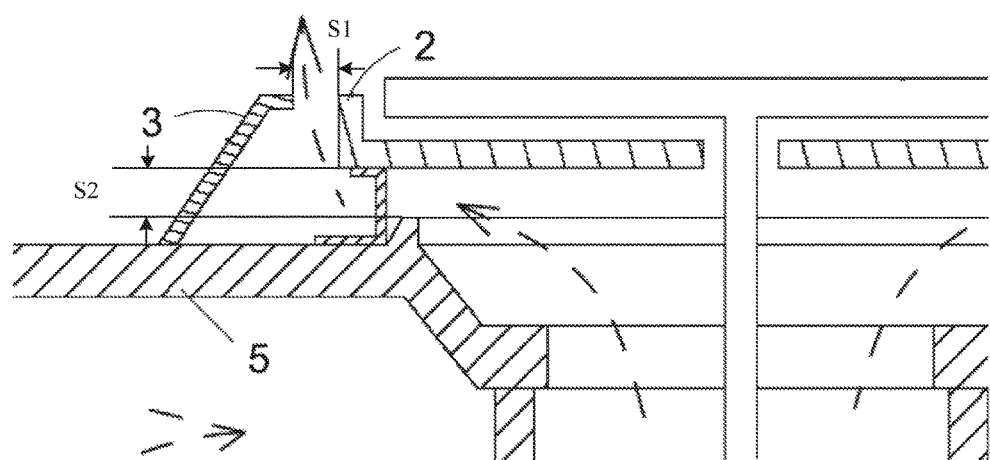
FIG. 4 is an enlarged sectional view of a portion of a structure where the windproof structure according to the first embodiment is mounted on the high-accuracy balance.

FIG. 4 is an enlarged sectional view of a portion of a structure where the windproof structure according to a first embodiment of the present invention being mounted on the high-accuracy balance 100. FIG. 4 is an enlarged sectional view of a portion of the high-accuracy balance having the windproof structure according to the present invention, and more clearly illustrates a sectional view of the present invention where the isolation baffle 2 is mounted on the upper base cover 5 of the high-accuracy balance.

Figure 5:
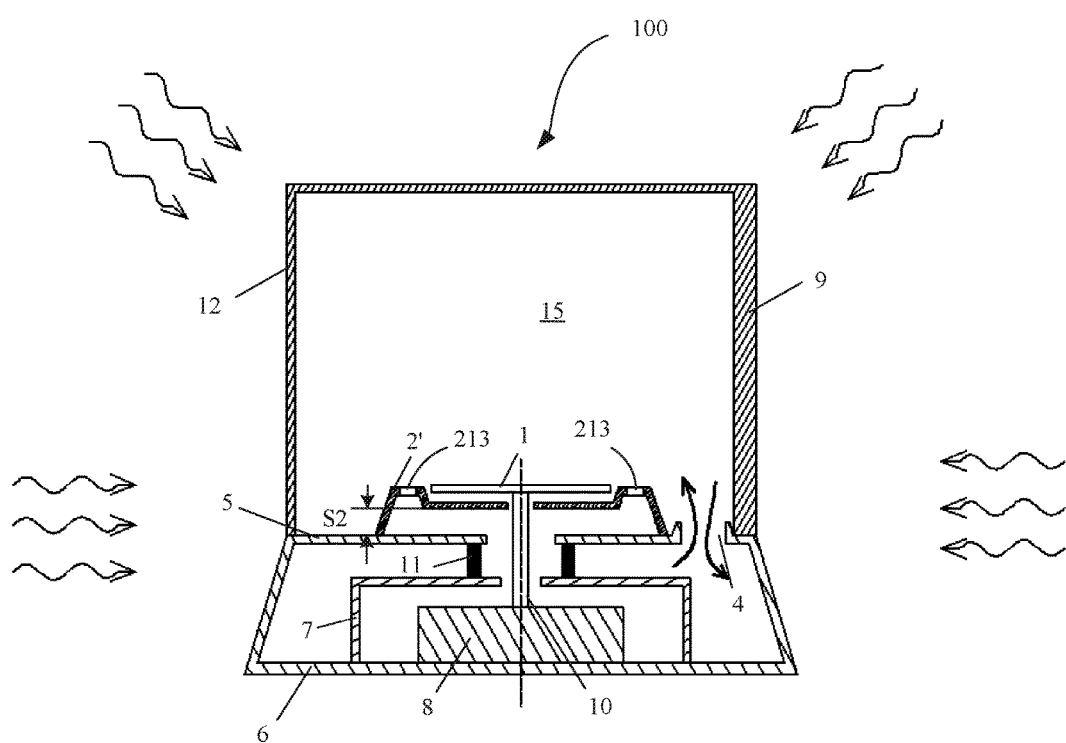
FIG. 5 is a sectional view of a high-accuracy balance having a windproof structure according to a second embodiment.

FIG. 5 is a sectional view of another embodiment of a high-accuracy balance 100 having a windproof structure according to a second embodiment of the present invention. With reference to FIG. 5, the windproof structure of the present embodiment comprises a base and a wind shield 12 placed above the base. The base comprises an upper base cover 5 and a lower base cover 6. The upper base cover 5 has a central hole placed in the middle. A circularly shaped windproof structure is placed above the upper base cover 5 around a weighing pan 1 of the balance 100. A shield 7 is placed between the upper base cover 5 and the lower base cover 6 that receives a weighing sensor 8 of the balance 100. A weighing compartment 15 for receiving the weighing pan 1 is formed between the wind shield 12 and the upper base cover 5. Since each door of the wind shield 12 is a moving part, the level of sealing of the weighing compartment is relatively low.

The windproof structure further comprises an isolation baffle 2', where the isolation baffle 2' is placed between the weighing pan 1 and the upper base cover 5. The isolation baffle 2' provides protection to the weighing pan 1 so as to reduce the effect of air disturbance.

In an example, the space in the height direction of the weighing pan 1 and the central hole may be increased. Without affecting the appearance, the distance in the height direction of the space between the isolation baffle 2' and the upper base cover 5 may be increased. Increasing the space may significantly reduce the speed of air flow so that the air flow may be effectively buffered before rising to the isolation baffle 2'. More specifically, the distance between the isolation baffle 2' and the upper base cover 5 may be 10-30 mm. Preferably, the distance between the isolation baffle 2' and the upper base cover 5 may be 20 mm. The isolation baffle 2' has a hole placed in the middle for a connecting rod 10 of the balance 100 to go through, wherein the connecting rod 10 connects the weighing pan 1 and the weighing sensor 8.

Figure 6A:
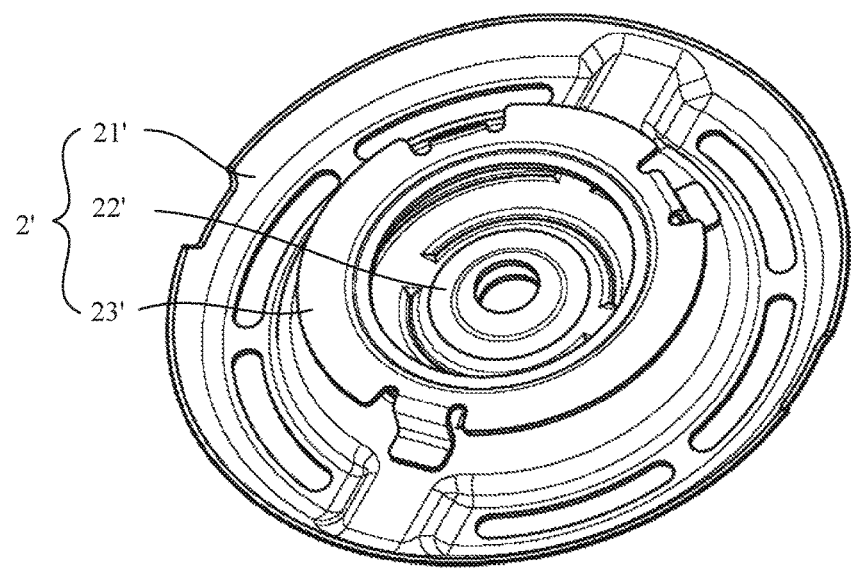
FIG. 6(a) is a bottom perspective view of an isolation baffle inside the windproof structure according to the second embodiment.
Figure 6B:
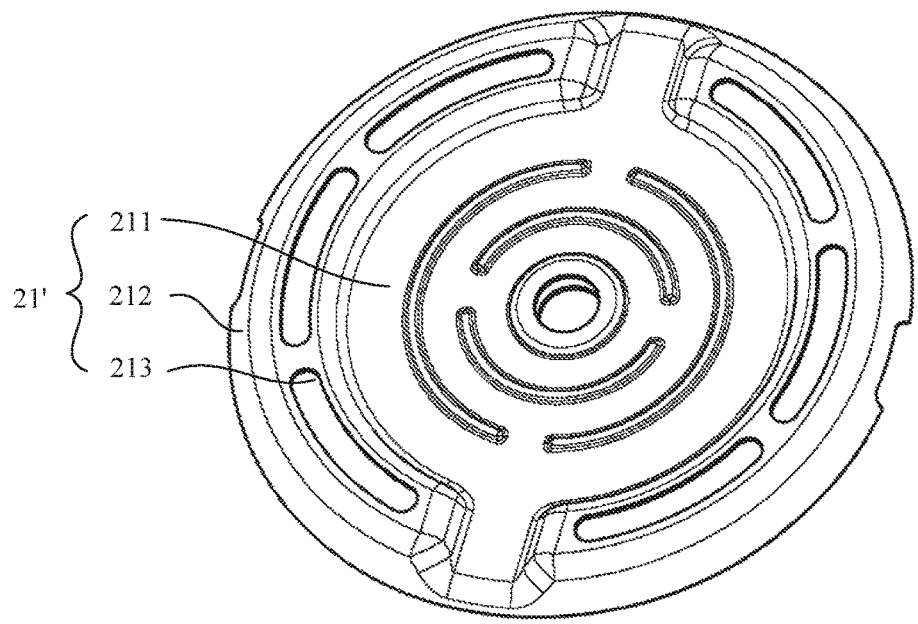
FIG. 6(b) is a front perspective view of an isolation baffle inside the windproof structure according to the second embodiment.

FIG. 6(a) is a bottom perspective view of an isolation baffle 2' of the windproof structure according to a second embodiment of the present invention. FIG. 6(b) is a front perspective view of an isolation baffle 2' of the windproof structure according to a second embodiment of the present invention. With reference to FIGS. 6(a) and 6(b), the isolation baffle 2' comprises a primary baffle 21', a cone plate 22', and a bracket 23'. The primary baffle 21' is substantially in a disc shape and is placed between the weighing pan and the upper base cover 5. The primary baffle 21' has a flat portion 211 in the middle and a skewed portion 212 at the edge. A plurality of through-holes 213 are placed at the junction of the flat portion 211 and the skewed portion 212. The main function of the primary baffle 21' is isolation and air flow guidance.

The cone plate 22' is placed below the primary baffle 21' with its outer cone surface downwards, i.e., towards the central hold of the shield 7. The cone plate 22' merely provides auxiliary function for air flow guidance so as to allow the air flows to flow from center to edge along a radial direction of the cone plate 22' and the primary baffle 21'.

The bracket 23' has a plurality of bending legs and its center is in a large disc shape. The primary baffle 21' and the bracket 23' may be firmly jointed via viscose glue or welding. The material of the isolation baffle 2' may be plastic or sheet metal piece. The isolation baffle 2' is secured to the upper base cover 5 via its bracket 23'.

The primary baffle 21' is preferably made of one piece. Specifically, the whole isolation baffle 2' can be made of one piece, but at least the primary baffle 21' together with the cone plate 22' can be formed of one single piece.

Referring back to FIG. 5, when the isolation baffle 2' is placed on the upper base cover 5, the skewed portion 212 of the primary baffle 21' is fitted to the upper base cover 5 with almost no gap. A space S2 allowing air flow is formed between the flat portion 211 of the primary baffle 21' and the upper base cover 5. The air may flow through an air convection channel formed by the space S2 and the through-holes 213 in order to allow the air in the weighing sensor cavity and in the base cavity to flow in a direction as shown by dotted arrow so as to protect the stability of the balance not to be disturbed.

When the external environment of the balance 100 is not stable, for example there is wind blowing through the balance 100 or the environmental temperature is changing, the air pressure in each cavity may differ due to the different sealing level of each cavity. Therefore, air in each cavity begins a natural convection procedure so as to eliminate pressure difference. In order not to let the central hole of the balance 100 become the only convection channel so as to bear all the air flow, an additional air exchange hole 4 may be present in order to enable to bypass air flow and reduce the disturbance of the air flow to the weighing pan 1 at a central hole region and a joint portion between the weighing pan 1 and the weighing sensor 8. The present embodiment also has an air exchange hole that is similar to the air exchange hole 4 in the first embodiment. The larger the area of the air exchange hole 4, the more quickly the pressure difference is eliminated and the better the effect. In the application of the present embodiment, the position and area of the air exchange hole may be correspondingly adjusted according to the requirement of the industrial modeling. In a specific example, the area of the air exchange hole 4 may be approximately 1000 $mm^2$.

In the present embodiment, the base cavity is remained not ventilated with respect to the sensor cavity. Since the level of sealing of the sensor cavity is high, its internal pressure is almost always higher than that in another cavity. Therefore, isolation helps to eliminate the convection disturbance of air in a central hole region of these two cavities. For example, a sealing part 11 (e.g., sealing foam) is placed between the upper base cover 5 and the shield 7 may be used to isolate these two cavities.

Further, enlarging the area of the central hole may advantageously reduce the speed of air flowing out from the sensor cavity and may also reduce disturbance to weighing. In an application example, the area of the central hole may be correspondingly adjusted according to the requirement of the industrial modeling.

It is proved by a large amount of parallel tests that the technical solution of the present invention has best effects in prevent the balance from the air flow disturbance. More specifically, under common laboratory conditions, the 1/100000 balance may reach its stability after 3.8 seconds from loading, and the repeatability standard deviation is ensured to be 1.4 days. The windproof structure of the present invention may also be applied to analytical-level balances and semi micro-level balances.

While the foregoing is directed to embodiments of the present disclosure, other and further embodiments of the invention may be devised without departing from the basic scope thereof, and the scope thereof is determined by the claims that follow.

What is claimed is:

1. A balance comprising:
  a weighting pan;
  a weighing sensor;
  a rod that connects the weighing pan to the weighing sensor, with the weighing pan directly above the weighing sensor; and
  a windproof structure, interposed between the weighing pan and the weighing sensor, such that the rod passes through the windproof structure, the windproof structure comprising:
    a base, the base comprising an upper base cover having a central hole through which the rod passes, a lower base cover, and a shield, positioned between the respective base covers, with the sensor positioned within the shield;
    a wind shield, located above the base, forming, with the upper base cover, a weighing compartment that receives the weighing pan, with an air exchange hole of the upper base cover placed near a back plate of the wind shield; and
    an isolation baffle, comprising a primary baffle and a bracket that secures the isolation baffle to the upper base cover.

2. The balance of claim 1, wherein:
the bracket arranges the primary baffle at a distance of 10 to 30 mm from the upper base cover.

3. The balance of claim 2, wherein:
an air convection channel is defined by a gap between the primary baffle and the windproof ring and a space between the primary baffle and the upper base cover.

4. The balance of claim 2, wherein:
the primary baffle is positioned at a distance of 20 mm from the upper base cover.

5. The balance of claim 1, wherein:
the isolation baffle has a hole placed in the middle.

6. The balance of claim 2, wherein:
the primary baffle comprises a flat portion in a middle thereof and a skewed portion at an edge, with a through-hole located at a junction of the flat portion and the skewed portion.

7. The balance of claim 1, wherein:
an edge of the air exchange hole has a convex shape.

8. The balance of claim 1, wherein:
the air exchange hole has an area of approximately 1000 $mm^2$.

9. The balance of claim 6, wherein:
the primary baffle is at a distance of 20 mm from the upper base cover.

10. The balance of claim 6, wherein:
the flat portion has a central hole.

11. The balance of claim 6, wherein:
the isolation baffle further comprises a cone plate, placed below the primary baffle with an outer cone surface thereof facing downwards.

* * * * *